Patented June 26, 1945

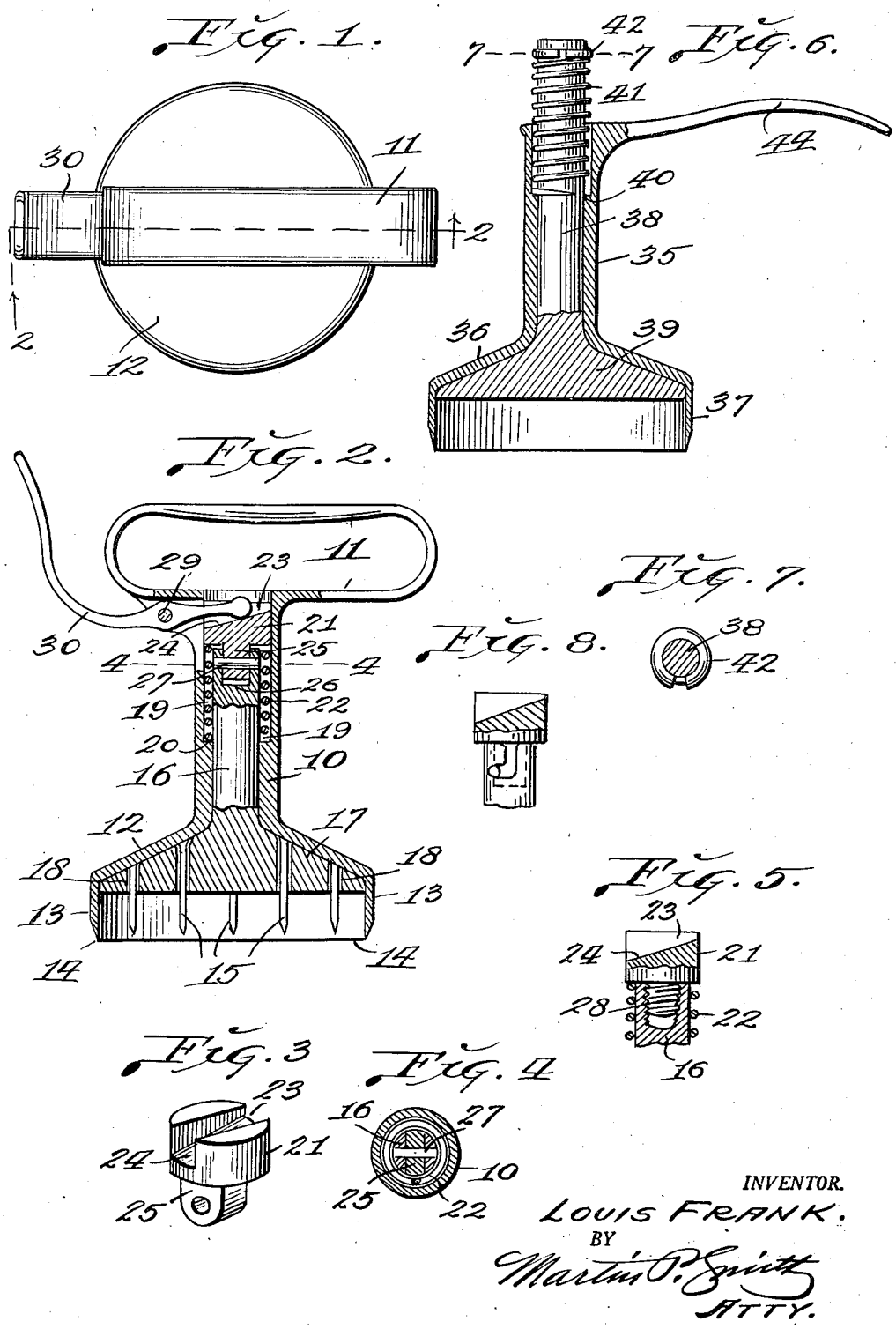

2,379,140

UNITED STATES PATENT OFFICE 2,379,140

COOKY CUTTER

Louis Frank, Fellows, Calif.

Application June 12, 1944, Serial No. 539,853

2 Claims. (Cl. 107—47)

My invention relates to a culinary utensil particularly designed for cutting cookies, biscuits, crackers and like baked products and the principal objects of my invention are, to generally improve upon and simplify the construction of existing forms of similar utensils and to provide a cooky and biscuit cutter which is simple in structure, inexpensive of manufacture and which is provided with simple and efficient means for expelling the cut products from the edged body of the device.

With the foregoing and other objects in view, my invention consists in certain novel features of construction and arrangement of parts which will be hereinafter more fully described and claimed and illustrated in the accompanying drawing in which:

Fig. 1 is a top plan view of a cutter constructed in accordance with my invention and which is designed for the cutting of cookies or crackers.

Fig. 2 is a vertical section taken on the line 2—2 of Fig. 1.

Fig. 3 is a perspective view of a plunger bearing block made use of in my improved cutter.

Fig. 4 is a horizontal section taken on the line 4—4 of Fig. 2.

Fig. 5 is a sectional view of a modified form of the plunger bearing block.

Fig. 6 is a vertical section taken through the center of a biscuit cutter constructed in accordance with my invention.

Fig. 7 is a horizontal section taken on the line 7—7 of Fig. 6.

Fig. 8 is a detail elevational view partly in section and showing a bayonet joint between the upper end of the plunger and the lever bearing block.

Referring by numerals to the acompanying drawing, particularly the structure illustrated in Figs. 1 to 4 inclusive, 10 designates a tubular body member on top of which is mounted a horizontally disposed loop handle 11 and formed integral with the lower end of said body member is a housing 12, preferably circular in shape and the marginal wall 13 of said housing having a sharpened lower edge 14.

Depending from housing 13, is a series of pins 15 which perforate the cooky or other food product cut by the device.

Arranged to slide freely within tubular member 10 is a plunger 16, carrying on its lower end, within housing 12 and wall 13, a disc 17 having apertures 18 for the accommodation of the pins 15, which disc, when moved downward, ejects the cut product from the device.

The upper portion of the bore through tubular member 10 is reamed out to provide a chamber 19, having a shoulder 20 at its lower end and arranged to slide in said chamber is a short block 21 which is detachably connected to the upper end of plunger 16.

An expansive coil spring 22 surrounds plunger 16 within chamber 19, with the upper end of said spring bearing on the underside of block 21 and the lower end bearing on shoulder 20.

Formed in the upper portion of block 21 is a transverse notch 23 having an inclined bottom surface 24, and depending from said block is a lug 25 which occupies a recess 26, in the upper portion of plunger 16 and being secured thereto by a transverse pin 27. An aperture in the wall of tubular member 10 permits pin 27 to be inserted.

If desired, block 21 may have a short threaded stem 28 which screws into the upper end of the plunger as illustrated in Fig. 5.

Fulcrumed on a pin 29 on the underside of handle 11 is the horizontal arm of an L-shaped lever 30, the end of which arm extends into notch 23 and bears on the inclined bottom surface 24 thereof. The end of the vertical arm of this lever terminates beyond and above the adjacent end of loop handle 11.

In the use of this form of cutter, the fingers of the operator's hand pass through handle 11 and said cutter manipulated so as to press the cutting edge 14 through the dough thus cutting a cooky, cracker or the like and the cut product being perforated by the pins 15. To eject the cut product from the utensil, the upper end of lever 30 is engaged by the user's thumb and drawn inward and upward, thereby moving the end of the horizontal arm of said lever downward, to bear on the inclined bottom face 24 of the notch 23 in block 21 thus forming said block, plunger 16 and disc 17 downward and thereby expel the cut cooky or cracker.

The downward movement of the parts just described, comprises spring 22 and after the product expelling function, said spring acts to return the parts to their normal positions.

The utensil illustrated in Figs. 6 and 7, which is intended for cutting biscuits and the like, comprises a tubular member 35, with a low conical housing 36 at its lower end and a wall 37 depending from the edge of said housing, the lower edge of which wall is sharpened.

Arranged for sliding movement in member 35 is a plunger 38 carrying on its lower end a disc which occupies housing 36.

Member 36 is provided near its edge with an internal shoulder 40 upon which rests the lower end of an expansive coil spring 41, the upper end thereof bearing against a snap ring 42 which is detachably seated in a groove in the upper portion of plunger 38.

Projecting outward from the upper portion of tube 35 is a handle 44. To use the biscuit cutter, same is manipulated so as to force the cutting edge of wall 37 through the dough and to expel the cut biscuit, the user's thumb or index finger imparts downward pressure on plunger 38 to remove same downward against the yielding resistance of spring 43 and thus disc 39 is moved downward within housing 36 and depending wall 37.

Practically all parts of my improved utensil may be made from plastics or metal, or a combination thereof, and the finished utensil is light in weight, compact and provides a very convenient and useful culinary adjunct.

It will be understood that minor changes in the size, form and construction of the various parts of my improved cooky or biscuit cutter may be made and substituted for those herein shown and described without departing from the spirit of the invention, the scope of which is set forth in the appended claims.

I claim as my invention:

1. In a cooky or biscuit cutter, a tubular member, a housing on the lower end of said tubular member, said housing including a marginal wall having a sharp lower edge, a handle on the upper end of said tubular member, plunger arranged for sliding movement through said tubular member, there being opposing shoulders formed on said tubular member and plunger, an expansive coil spring surrounding said plunger with its ends bearing on said shoulders a block removably mounted on the upper end of said plunger, said block being provided with a notch having an inclined bottom surface and a lever pivoted on the upper portion of said tubular member, with the inner end of said lever bearing on the inclined bottom surface of the notch in said block.

2. A cooky and biscuit cutter as set forth in claim 1, including a disc carried by the lower end of said plunger and located within said housing, said disc being perforated and pins depending from the upper portion of said housing and extending through the perforations in said disc.

LOUIS FRANK.